(12) United States Patent  
Rohde

(10) Patent No.: US 9,298,847 B1  
(45) Date of Patent: Mar. 29, 2016

(54) LATE BOUND, TRANSACTIONAL CONFIGURATION SYSTEM AND METHODS

(71) Applicant: EMC Corporation, Hopkinton, MA (US)

(72) Inventor: Henning K. Rohde, Woodinville, WA (US)

(73) Assignee: EMC Corporation, Hopkinton, MA (US)

( * ) Notice: Subject to any disclaimer, the term of this patent is extended or adjusted under 35 U.S.C. 154(b) by 206 days.

(21) Appl. No.: 14/136,964

(22) Filed: Dec. 20, 2013

(51) Int. Cl.  
*G06F 17/30* (2006.01)

(52) U.S. Cl.  
CPC ................................. *G06F 17/30943* (2013.01)

(58) Field of Classification Search  
None  
See application file for complete search history.

(56) References Cited

U.S. PATENT DOCUMENTS

| | | | | |
|---|---|---|---|---|
| 5,319,779 A * | 6/1994 | Chang et al. | ...... | G06F 17/30324 |
| 6,128,730 A * | 10/2000 | Levine | ................ | G06F 12/0813 |
| | | | | 711/E12.025 |
| 6,687,732 B1 * | 2/2004 | Bector | .............. | H04L 29/12009 |
| | | | | 709/200 |
| 7,558,835 B1 * | 7/2009 | Shafer | ................... | H04L 41/082 |
| | | | | 707/999.01 |
| 2002/0133504 A1 * | 9/2002 | Vlahos | ............. | G06G 17/30566 |
| 2005/0076046 A1 * | 4/2005 | Goldsack | .......... | G06F 17/30504 |
| 2005/0091346 A1 * | 4/2005 | Krishnaswami | .... | G06F 9/44505 |
| | | | | 709/220 |
| 2007/0282951 A1 * | 12/2007 | Selimis | ................... | H04L 67/06 |
| | | | | 709/205 |
| 2009/0300049 A1 * | 12/2009 | Zhang | ..................... | G06F 21/57 |
| 2012/0151443 A1 | 6/2012 | Rohde et al. | | |

* cited by examiner

*Primary Examiner* — Robert Beausoliel, Jr.  
*Assistant Examiner* — Nirav K Khakhar  
(74) *Attorney, Agent, or Firm* — Daly, Crowley, Mofford & Durkee, LLP

(57) ABSTRACT

Systems and methods for configuring software systems help guarantee correctness while providing operational flexibility and minimal time to recover. A configuration system uses a un-typed syntax tree with transactional semantics layered under a set of late-bound semantic constraints. Configuration settings are defined in property flies which are parsed into a syntax tree during startup and which can be safely reloaded. Semantic constraints are dynamically specified by software components. The system maintains a transactional history to enable rollback and inspection.

18 Claims, 9 Drawing Sheets

```
302  //
304  // service.conf
306  //
308
310  include component1.conf
312
314  component1.foo.bar = 99
316  timezone= UTC
318
320  component2.* = true
```

```
332  // component1.conf
334
336  [component1]
338  ?.bar = 4
```

LATE BOUND, TRANSACTIONAL CONFIGURATION SYSTEM AND METHODS

CROSS REFERENCE TO RELATED APPLICATIONS

Not Applicable.

BACKGROUND

Many production software systems include a large number of services and components, each having many configuration settings. In complex systems, the business logic for each service and/or component is typically kept in a configuration file and must be carefully defined to satisfy various requirements, such as regulatory compliance. A system operator is tasked with correctly configuring long-running services to minimize service interruptions. When a service fails for bad configuration, the operator must quickly identify the root cause—that is, which recent configuration changes caused the failure—and reconfigure the system to correct the problem.

Software configuration systems are known. A typical approach is to define a software system's configuration using key/value pairs, which can be encoded in XML, JSON, or simple text property files, such as Java property files. Configuration keys are literal values used in both the configuration files and the software. A configuration setting may a have default value defined in the software; that is, if the setting is not explicitly defined in the configuration file, the default value is used. Existing configuration systems may provide an application programming interface (API) through which software components can retrieve the configuration settings.

As those skilled in the art will appreciate, several problems commonly appear with existing software configuration systems. Existing systems are prone to operator error. For example, if a configuration key is misspelled, a default value may be used instead, unbeknownst to the operator. Another common problem is that if a key appears multiple times within a configuration file, all but one of the corresponding values will be ignored, leading to unintended results. Duplicate keys also decrease the conciseness and readability of a configuration file.

Many existing configuration systems require a service to be restarted to change any of its configuration settings. Moreover, even if a service supports dynamic reconfiguration (i.e. without needing to restart the service), certain settings may be de facto immutable. For example, in certain applications, network configuration settings cannot be changed without causing unacceptable service interrupts and are, therefore, treated as immutable. Generally, any configuration value used during initialization is de facto immutable.

Existing configuration systems typically lack adequate tools to debug/investigate configuration problems. When a service or component is misconfigured, it can be difficult to determine how it ended up in such a state. Operators may resort to manually versioning a configuration file before making changes and comparing versions to identify the root cause (i.e. bad configuration). Likewise, many existing systems do not provide rollback capability, instead requiring operators to manually revert bad configuration settings.

Some existing configuration systems use XML schemas to solve some of these problems. For example, XML schemas can be used to prevent misspelled and duplicate configuration keys. However, using XML schemas comes at a high cost: all keys must be maintained in a schema definition as well as in the software component code that uses the corresponding configuration settings. If the schema definition and code are not in sync, the system will either reject good configuration or accept bad configuration.

SUMMARY

Accordingly, an object of the instant disclosure is to provide improved configuration systems and methods, particularly configuration systems and methods that help guarantee correctness while providing operational flexibility and minimal time to recover.

Presently described is a computer system, comprising: a memory; a plurality of configuration keys; a semantic registry to store, in the memory, a plurality of semantic constraints, each of the plurality of semantic constraints associated with one of the plurality of configuration keys; a syntax parser to receive text from a configuration source, to parse the text to generate a plurality of key definitions, each of the key definitions associated with one of the plurality of configuration keys and having a corresponding value; a semantic validator to receive the plurality of key definitions and to validate each of the plurality of key definitions using ones of the plurality of semantic constraints associated with the same key as the key definition; and a syntax history module to commit the plurality of key definitions to the memory. The computer system may further comprise an input/output (IO) module to read a property file, wherein the text is based upon the contents of the property file.

Also presently described is a method implemented in a computer system comprising a memory, the method comprising: receiving a plurality of semantic constraints, each of the plurality of semantic constraints associated with one of a plurality of configuration keys; storing the semantic constraints to the memory; receiving text from a configuration source; parsing the text to generate a plurality of key definitions, each of the key definitions associated with one or more configuration keys and having a corresponding value; validating each of the plurality of key definitions using ones of the plurality of semantic constraints associated with the same configuration keys as the key definition; and committing the key definitions to the memory.

In one aspect, at least one of the semantic constraints used in the system and/or method includes a data type and validating the plurality of key definitions comprises determining if at least one of the key definitions has a value compatible with the data type.

In one aspect, the system and method maintain an ordered list of commits in the memory, each commit having one or more key definitions, wherein committing the parsed key definitions to the memory comprises adding a commit to the end of the list of commits. In a particular aspect, each commit may comprise a tree, each leaf of the tree generally corresponding to one of the plurality of key definitions. The ordered list may include a first commit and a second commit, and the system and/or method merges commits by copying a portion of the first commit tree to the second commit tree, the portion of the tree corresponding to one or more key definitions in the first commit. In some aspects, each of the plurality of key definitions is either an explicit key definition or a default key definition, and a default key definition in the first commit is copied to the second commit tree only if the second commit does not include a corresponding key definition.

BRIEF DESCRIPTION OF THE DRAWINGS

Various embodiments of the systems and methods sought to be protected herein may be more fully understood from the following detailed description of the drawings, in which:

FIGS. 3 and 3A are listings of exemplary property files for use in a configuration system;

DETAILED DESCRIPTION

Before describing embodiments of concepts, systems, and techniques sought to be protected herein, some introductory concepts and terminology are explained. As used herein, the term "application" is used to describe either an executable computer program stored in a memory, or a task being managed by an operation system (OS), such as a Linux process. Those skilled in the art will appreciate that modern operating systems are capable of managing several tasks concurrently and therefore, a single application may refer to a plurality of active tasks. The term "operator" Is used herein to describe a person or machine that operates a software system.

The terms "configuration key definition" and "key definition" each refers to a setting used to configure a software service and/or component. The term "tree", as used herein, refers to a data structure, commonly used in computer science, based upon graph theory. Those skilled in the art will understand that a tree is a rooted, connected, directed graph without cycles. Each node of a tree has exactly one edge directed thereto, except for the root node which has none. The terms "leaf" and "leaf node" both refer to a node of degree one, and the term "branch" refers to an edge of the tree.

Figure 1:
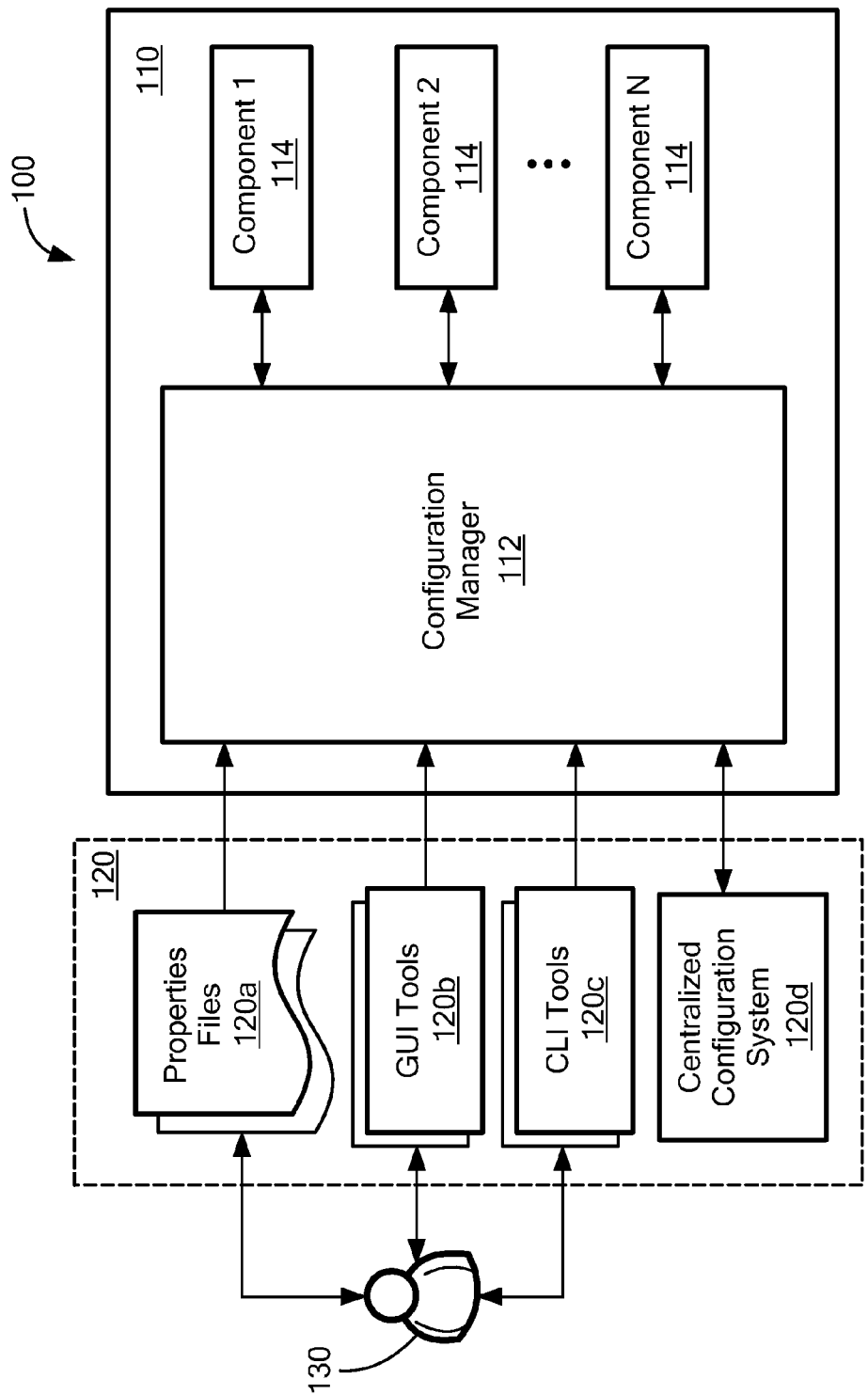
FIG. 1 is a diagram of an exemplary configuration system embodiment for use in a software application.

Referring to FIG. 1, an exemplary embodiment of a configuration system 100 is shown for use with a software application 110. The configuration system 100 generally includes a configuration manager 112, one or more application components 114, and one or more configuration sources 120. An operator 130 may interact with one or more of the configuration sources 120 to define configuration settings used by the application 112.

The software application 110, configuration manager 112, application components 114, tools 120b, 120c, and the centralized configuration system 120d (collectively referred to herein as "the system components") may include hardware and/or software used to implement the respective functionality described hereinbelow. The system components may be coupled together as shown in FIG. 1, wherein each connection is provided as a hardware-based connection, a software-based connection, or a connection provided from a combination of both hardware and software. Thus, it should be appreciated by those skilled in the art that the software application 110 could be implemented entirely within a single computing device or distributed among a plurality of networked computing devices, the computing devices being either virtual machines or hardware-based devices. In one embodiment, one or more of the system components are provided upon a common physical or virtual computing platform and are coupled using inter-process communication (IPC) techniques. In some embodiments, at least two of the system components are provided upon separate physical or virtual computing platforms and are coupled via a local-area network (LAN) and/or a wide-area network (WAN). In a particular embodiment, the software application 110 and centralized configuration system 120d are provided on separate computing platforms. One of ordinary skill in the art, after the reading the disclosure provided herein will appreciate that a wide variety of different configurations may be used and that the exemplary system components may be coupled in configurations other than shown in FIG. 1.

In some embodiments, the application 110 may include a logging subsystem by which any of the system components can send arbitrary messages to be logged to a log file, a database, or any suitable storage facility.

It will further be appreciated that a single configuration system 100 may be used by a plurality of software applications. For example, the configuration system 100 may be used within a complex production software system that includes a large number of services, each service embodied as one or more software applications, and each application including one or more application components.

The configuration manager 112 is discussed in detail below in conjunction with FIG. 2. Suffice it to say here, the configuration manager 112 generally receives configuration definitions from the configuration sources 120 and/or configuration application components 114, and performs both syntactic and semantic validation to help guarantee correctness within the software application 110. In some embodiments, the configuration manager 112 includes an internal application programming interface (API) used by components 114. In certain embodiments, the configuration manager 112 also includes an external interface used by the operator 130, the GUI tools 120b, the CU tools 120c, and/or the centralized configuration system 120d. The API and/or external interface may include operations to load configuration definitions, inspect configuration syntax and semantics, and inspect a transaction history maintained by the configuration manager 112. In a particular embodiment, the external interface may include Web Service. In one embodiment, the operator can use the external interface, either directly or indirectly via the tools, to inspect configuration state.

Each of the application components 114 represents a discrete functional unit of the application 110. The number of components within an application and the functionality embodied within each such component is generally determined by the application architects and/or developers and the systems and methods sought to be protected herein are not limited to any particular components or arrangement thereof. In one embodiment, the application 110 is programmed using an object-oriented paradigm (e.g. using the Java® programming language) and each of the components 114 generally corresponds to one or more classes within the application. One of the components, referred to herein as the "initialization component", may responsible for initializing the application and various resources used therein. The components 114 may interact with the configuration manager API, as discussed further below in conjunction with FIG. 2. In some embodiments, the initialization component uses the API to initialize the configuration system.

The configuration system 100 receives configuration settings from various configuration sources 120, including but not limited to property files 120a, graphical user interface (GUI) tools, command-line interface (CU) tools 120c, and/or a centralized configuration system 120d.

The property files 120a are text and/or binary files that are stored upon a non-volatile memory, such as a solid-state drive (SSD) or a hard disk, and that are accessible by the configuration manager 112. In embodiments, the configuration system 100 includes a file system by which the configuration manager 112 accesses the property files 120a. In embodiments, the property files 120a are line-oriented text files, wherein each line either defines one or more configuration setting or has a special form. In most embodiments, the property files 120a have syntax similar to Java® property files.

FIGS. 3 and 3A illustrate exemplary property files 300 and 330, respectively. As shown, the property file 300 includes comment lines 302, 304, 306, blank/whitespace lines 308, 312, 318, an include directive line 310, and key definition lines 314, 316, 320. The property file 320 includes comment line 332, a blank/whitespace line 334, a section directive line 336, and a key definition line 338.

The include directive line 310 instructs the parser to load and parse (as part of the same commit) the contents of the contents of the referenced property file—the file named "component1.conf" in this example, corresponding to exemplary file 330. In some embodiments, each property file may be associated with a software service, a software component, or a group of services and/or components. For example, exemplary file 300 may be associated with a service named "service" having a component named "component1". Thus, property files can be organized to reduce operation complexity.

Each of the key definition lines 314, 316, 320, 338 define a key and a corresponding value, separated by a delimiter (the delimiter "=" is used in these examples). Keys are comprised of one or more parts, each part separated by a delimiter (the delimiter "." being used here). For a given key, preceding parts define a scope for subsequent parts, and the parts are collectively referred to as the "key path." Thus, in one aspect, key parts other than last key part define a scope/namespace. An alternate syntax for scoping keys is also provided, namely the use of a section directive line, such as line 336. When the parser encounter's a section directive line, it scopes all subsequent keys (up until the next section directive) based on a path indicated in the section directive. Thus, in the exemplary file 330, the key definition on line 338 is scoped within "component1" and is therefore equivalent to the syntax "component1.?.bar=4". In one aspect, a key path defines a path within a tree data structure, as described below in conjunction with FIGS. 5-5C. Key definition values may be expressed as scalar values or collections of scalar values; in embodiments, a value may include comma-separated list of scalar values.

Still referring to FIGS. 3 and 3A, two special "wildcard" symbols may be used as parts of a key: the wildcard "?" which defines a default value for several keys; and the wildcard character "*" which defines an explicit value to several keys. Thus, in the exemplary property file 300, line 320 specifies that all keys in the "component2" namespace have the explicit value "true", whereas line 338 in file 340 specifies that all keys in a scope directly below the scope "component1" that end with the part "bar" have the default value "4". In some aspects, the systems described herein make a distinction between default values and explicit values, whether defined using a wildcard or not, and thus the property file syntax does not conflate these two concepts. In embodiments, a given key (i.e. key path) may not be explicitly defined multiple times within a property file or files included therefrom (i.e. there no key may be defined more than once in a given commit); this condition may be enforced by the semantic validator 204 (FIG. 2). Thus, for example, it would be invalid to add the key definition "component2.foo=10" to the property file 300 because that file also defines the same key on line 320.

In some embodiments, the configuration system 100 gives precedence to explicitly defined values over default values and thus, it will be appreciated that the order of definitions with a property file generally does not affect the resulting configuration state.

Referring again to FIG. 1, the operator 130 may generate and/or edit the property files 120a using any suitable text editor. An application component 114 and/or the configuration manager 112 may load the property files 120a during startup. In some embodiments, the application explicitly loads a property file 120 via a configuration manager API operation, as discussed further below in conjunction with FIG. 2. The configuration manager 112 performs syntactic and semantic validations on the property file and signals an error condition if the file is invalid. In some embodiments, the configuration manager raises an exception if a property file 120a is invalid and the application components 114, in turn, may cause the application to terminate and/or log a detailed warning via the logging subsystem.

In exemplary embodiments, the application 110 may be configured to reload the property files in response to an external trigger, such as a Portable Operating System Interface (POSIX) signal or other IPC mechanism. In certain embodiments, the external trigger is associated with at least one of the external interface operations. If reload fails (e.g. the property file is syntactically or semantically invalid), the application may log an appropriate warning via the logging subsystem. In most embodiments, the application 110 will continue normal operation if a reload falls.

Each of the GUI tools 120b includes a suitable graphical interface to enable the operator 130 to define one or more configuration settings. Thus, the GUI tools may include, but not limited to, desktop applications, web applications, mobile applications, and/or tablet computer applications. In one embodiment, a GUI tool 120b includes a form having a plurality of texts inputs, each text input accepting either configuration setting key or a corresponding value. In some embodiments the form includes a multi-line text input to receive multi-line syntax similar to that used within the property files 120a. In certain embodiments, the form includes an optional text field wherein the operator can enter the reason for the corresponding configuration changes. In most embodiments, a GUI tool 120b includes a button or other control which, when activated, causes the GUI tool 120b to send the configuration text/definitions to the configuration manager 112 via its external interface. Thus, it should be appreciated that a GUI tool 120b can be executed on a different computing environment from the application 100 and may access the external interface over a computer network. Along with the configuration definitions, the tool 120b also sends contextual information ("context") which may be stored along with the corresponding configuration definitions within the configuration manager 112, as discussed further below in conjunction with FIG. 2. The context can include the operator's identity, the time the changes were submitted by the operator, the name and/or type of the tool being used, and the optional reason. The configuration manager 112 processes the received configuration definitions according to the methods described below, and returns feedback information to the tool 120b. In some embodiments, the feedback information indicates whether the configuration definitions were accepted or rejected and, if rejected, includes a detailed error message. The GUI tool 120b may, in turn, display the feedback information to the operator 130.

Each of the CLI tools 120c includes a suitable command-line interface to enable the operator 130 to define one or more configuration settings. In an exemplary embodiment, a CLI tool 120c accepts a property file as input and sends the contents of the property file to the configuration manager 112 via its external interface. Feedback information may be returned and displayed as with the GUI tools 120b.

In some embodiments, the GUI tools 120b and/or CU tools 120c do not send configuration definitions directly to the configuration manager (i.e. via the external interface), but instead operate on one or more of the property files 120a. The tools may read a property file from the file system, add/edit/delete lines based on the user input, write the modifications back to the file system, and trigger the application 110 to reload the property file. In this way, the tools 120b, 120c provide an alternate means for an operator 130 to generate and/or edit the property files 120a. In some embodiments, the tools 120b, 120c perform certain syntactic and/or semantic validations to provide improved responsiveness to the user compared with tools that rely only on the configuration manager 112 to detect syntax/semantic errors. In embodiments, the tools 120b, 120c can be used by an operator to inspect the configuration system state.

The centralized configuration system 120d may include any suitable centralized service for maintaining configuration information, including commercial off-the-shelf (COTS) software products, or open source products, such as Apache ZooKeeper™. In some embodiments, the application 110 is configured to retrieve (i.e. "pull") configuration definitions from the centralized configuration system 120d using an external interface provided therein. In other embodiments, the centralized system 120d is configured to send (i.e. "push") configuration definitions and context to the application 110 using the configuration manager's external interface. In yet another embodiment, one of the tools 102b, 102c acts as an intermediary, retrieving definitions from the centralized system 120d and sending those definitions, along with context, to the application 110. In exemplary embodiments, a single centralized configuration system 120d is used by several software services and/or applications via a computer network.

Figure 2:
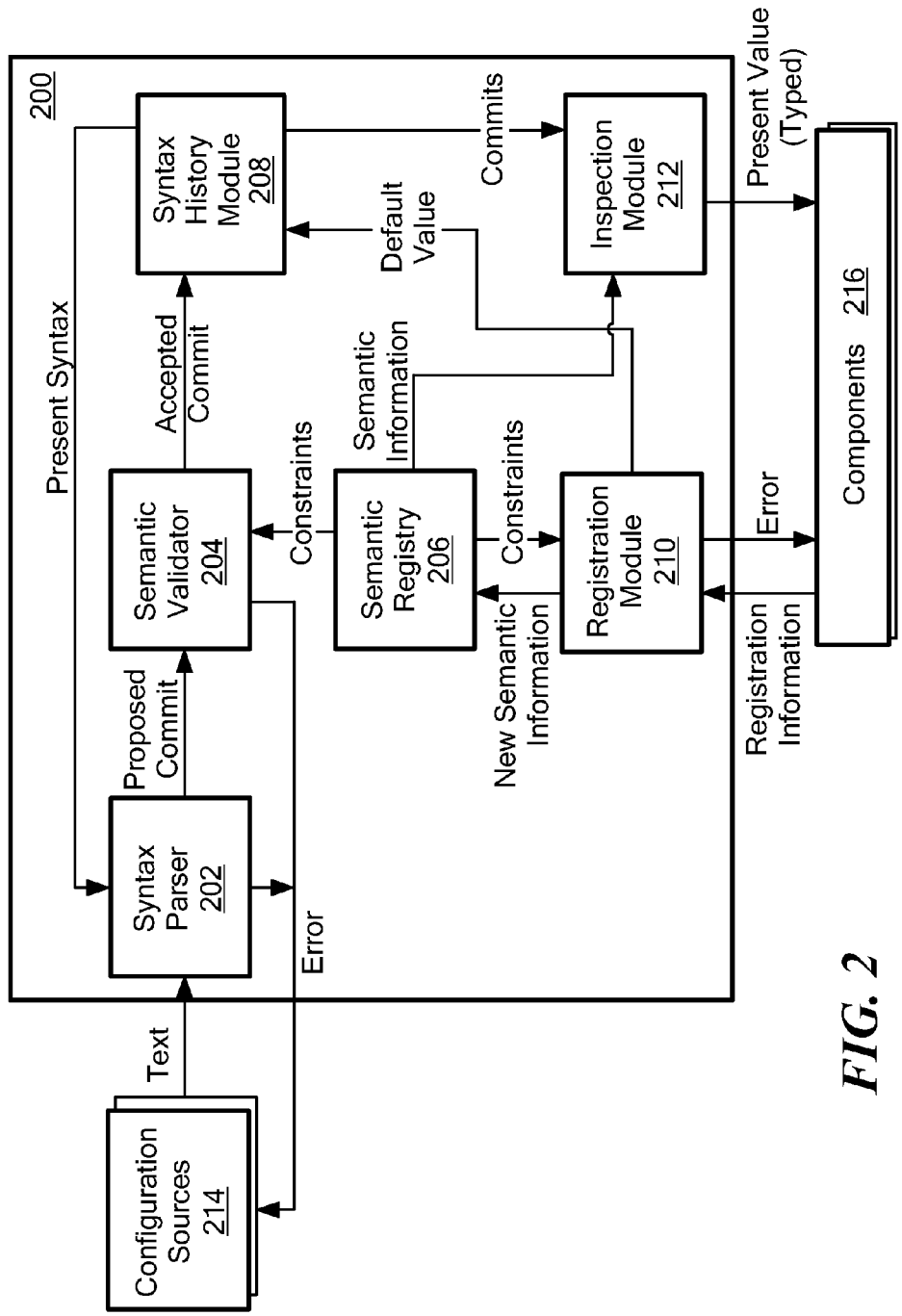
FIG. 2 is a diagram of an exemplary configuration manager embodiment.

Referring now to FIG. 2, an exemplary configuration manager 200, which may be the same as or similar to configuration manager 112 in FIG. 1, is shown. The configuration manager 200 includes a syntax parser 202, a semantic validator 204, a semantic registry 206, a syntax history module 208, a registration module 210, and an inspection module 212.

In an exemplary embodiment, the configuration manager 200 includes an internal API for use by application components 216 and an external interface for use by one or more configuration source 214, which are the same as or similar to configuration sources 120 in FIG. 1. In one embodiment, the API and/or external interface include, but are not limited to, the operations shown in TABLE 1. The exact operations and corresponding input parameters and outputs shown in TABLE 1 are merely illustrations included herein for convenience of explanation and the systems and methods sought to be protected herein are not limited to any particular such operations or parameters. The various operations show in TABLE 1 will be discussed below in conjunction with the several configuration manager components 202-212.

TABLE 1

| Operation | Inputs | Outputs |
|---|---|---|
| LOAD_DEFINITIONS | Configuration text Context information | Exception if parsing or semantic validation fails |
| ROLLBACK | N/A | Exception if no definitions have been loaded or rollback not permitted due to semantic constraints |

TABLE 1-continued

| Operation | Inputs | Outputs |
|---|---|---|
| REGISTER_TYPE | Key Data type | Exception if present value (or default value) is incompatible with data type |
| SET_DEFAULT | Default value | Exception if present value is incompatible with default value or default previously defined |
| SEAL | Key | Exception if key definition does not exist |
| GET_VALUE | Key Data type | Present value (typed) Exception if no key definition or present syntax incompatible with the specified data type. |

The configuration manager components 202-212 include hardware and/or software used to implement the respective functionality described hereinbelow. The components 202-212 may be coupled together as shown in FIG. 2, wherein each connection is provided as a hardware-based connection, a software-based connection, or a connection provided from a combination of both hardware and software. One of ordinary skill in the art, after the reading the disclosure provided herein will appreciate that the number of components and coupling of components shown in the exemplary embodiment of FIG. 2 is merely one possible configuration and that a wide variety of different configurations may be used.

The syntax parser 202 receives configuration definitions/text from one or more configuration source 214 and parses the text into one or more syntactic configuration definitions. The text may include the contents of a property file, such as the exemplary property files shown in FIG. 3. In an exemplary embodiment, an application component reads the content of a property file at startup and invokes the parser using the LOAD_DEFINITIONS Internal API operation (TABLE 1).

The syntax parser 202 may use any suitable parsing library and/or pre-processing techniques. In most embodiments, the parser 202 scans each line of the text to identify key/value pairs and generates corresponding (scoped) key definitions based on the line syntax and preceding section directive lines. In embodiments, the parser 202 validates that each line of the syntax is either a key definition line, a comment line, a whitespace line, an include directive line, or a section directive line. The parser 202 may also validate that no key is defined multiple times. If the text fails to satisfy any of the validation criteria, the parser 202 rejects the text and generates an appropriate error, such as returning an error to the configuration source 214 or raising an exception within the application. Otherwise, the parser generates a proposed commit that includes the key definitions, parser context, and/or context from the configuration source. An exemplary commit is show in FIG. 4 and discussed below in conjunction therewith.

In embodiments, the syntax parser 202 may compare the proposed commit—or more specifically, the syntactical key definitions therein—against a previous commit. If the proposed commit and the previous commit are syntactically identically, the proposed commit may be disregarded to maintain a compact transaction history.

Although, as discussed below, the syntax parser 202 generally retains the entire text received from the configuration source, the parser may distinguish between key definitions which have presently changed over the previous commit and those which are syntactically identical to the previous commit. This distinction may be used by the semantic validator 204 to validate only the key definitions which have presently changed, thereby allowing an application to reload a property file even if some of the configuration settings defined therein are invalid according to present semantic constraints (so long as all the settings which have changed are semantically valid).

The semantic validator 204 generally receives a proposed commit from the syntax parser 202 and performs various semantic validations to accept or reject the commit. In one embodiment, the semantic validator 204 uses semantic constraints stored within the semantic registry 206 to validate the proposed commit. Two particular semantic constraints are contemplated. First, a configuration setting can be marked as immutable ("sealed"), indicating that its value cannot be changed. It should be appreciated that this constraint allows configuration settings to be explicitly immutable, not merely de facto immutable. Second, a configuration setting can typed, meaning it is associated ("registered") with a given data type and corresponding syntax values must be compatible with that date type. Examples of data types include, but are not limited to scalar types, such as a string, boolean, integer, enumeration, number, time, datetime; or collections of one or more scalar types, including a list, dictionary, or set. In some embodiments, a configuration setting can be constrained to multiple data types and the configuration system 100 guarantees that the corresponding present value is compatible with each of the data types. A given configuration setting may be subject to any, all, or no semantic constraints and constraints may be defined by the application components 216 at any time.

Thus, in some embodiments, the semantic validator 204 rejects the proposed commit if any key definition therein: (1) corresponds to an immutable configuration setting; or (2) has a value incompatible with any corresponding registered data type. If all validations succeed, the proposed commit is accepted (i.e. "committed") into the configuration system. For operational flexibility, commits can be partially forced through semantic constraints (e.g. immutable settings and data types). The system remains well-defined because semantically invalid key definitions are excluded from the commit.

The semantic registry 206 receives semantic information from the registration module 210, stores the information in memory, and provides semantic information to the semantic validator 204 and inspection module 212. The semantic information may be associated with one or more configuration keys. In embodiments, the semantic information includes one or more constraints, which are provided to the semantic validator 204.

The syntax history module 208 receives accepted commits from the semantic validator 204 and default value information from the registration module 210, and maintains a history of configuration syntax which is inspectable by an operator via the inspection module 212. To maintain configuration syntax history, the history module 208 uses data structures and techniques which are described in detail below in conjunction with FIGS. 5-5B.

In some embodiments, the syntax history module 208 includes a rollback function to revert the system configuration to a state prior to the most recent commit. In embodiments, the configuration manager maintains a chronologically ordered list of commits, and thus rollback may be achieved by simply removing the most recent commit from this list. It will be appreciated that rollback will succeed unless a semantic constraints were added after the previous commit was accepted and that commit is inconsistent with the later-added constraints. If rollback fails, the application and/or configuration manager may return an error to the operator and/or log a helpful error message via the logging system. In some embodiments, the rollback function is exposed via a ROLL-BACK API operation (TABLE 1).

The registration module 210 receives semantic constraint definitions and/or code defaults from the application components 216. In turn, the registration module sends semantic information to the semantic registry 206 and/or the code default to the syntax history module 208, as shown. In some embodiments, the application components 216 may interact directly with the semantic registry 206 and/or syntax history module 208. The registration module 210 may perform certain semantic validations in response to information received from the application components. In particular, the registration module 210 may validate that: a new code default is compatible with an existing registered data type stored within the semantic registry 206; and a new data type is compatible with the present syntactic value stored within the syntax history module. In some embodiments, the registration module 210 will raise an exception if there is no present value defined for the given key. A component can access a configuration setting without having set a code default, so long as a value is defined within a configuration source 214 (this may be useful, for example, to guarantee that a configuration setting is defined external to the software application or service). Conversely, a configuration setting need not be defined by a configuration source, so long as a code default has been set.

In particular embodiments, the semantic registry 206 and syntax history module 208 store semantic/syntax information in a volatile memory. One advantage to this approach is that, if a bad configuration change causes the system to fall and/or terminate, the system can be reverted to a known good state simply by restarting the service/application.

The inspection module 212 retrieves semantic information from the semantic registry 206, syntax history information from the syntax history module 208, and performs various processing thereon. In one embodiment, the inspection module 212 is used by the application components 216 (via an internal API) to query the present value for a give configuration key. The inspection module retrieves one or more commits from the syntax history module 208, semantic information from the semantic registry to determine the corresponding data type, and casts the syntactic key definition within the commits based upon the data type. If no data type has been registered, the inspection module 212 returns the un-typed syntax. In some embodiments, multiple data types may be registered for a given key, and a component specifies the desired data type as part of the query. It should be appreciated that syntax will be compatible with the data type because of semantic validation earlier performed the semantic validator 204 and registration module 210.

In view of the preceding description, it should be appreciated that the configuration manager 200 treats every commit similarly, no matter whether the key definitions came from a property file, tools used by the operator, or a centralized configuration system. Thus, the inspection module 212 can be used by an operator to determine the complete state of the configuration system at any point in time since startup, which configuration settings were changed in each commit, and which commits affected a given configuration setting. Moreover, because the configuration system maintains complete syntax history and context, the inspection module 212 can indicate ("highlight") the exact location (i.e. line number and context) within a source property file where a key was changed.

The application components 216 use the configuration manager 200 to define semantic constraints with the registration module 210. In an exemplary embodiment, the application components use the REGISTER TYPE API operation (TABLE 1) to register a data type for a given key. This operation will fail if the present value is not compatible with specified data type. An application component 216 may register a data type constraint at any time; however it is recommended that this occurs during startup to avoid incompatible data type errors from occurring during normal operation. In embodiments, the application components may also define a default value ("code default) for a given key, such as using the SET_DEFAULT API operation (TABLE 1). This operation may fall if a code default has previously been defined for the given key or if the configuration setting has been marked as immutable ("sealed"). In some embodiments, the application components 216 may also use the SEAL API operator (TABLE 1) to mark a configuration setting as immutable. At any time, an application component 216 may query the present value of a configuration setting from the inspection module 212, via the GET_VALUE API operation (TABLE 1).

Figure 4:
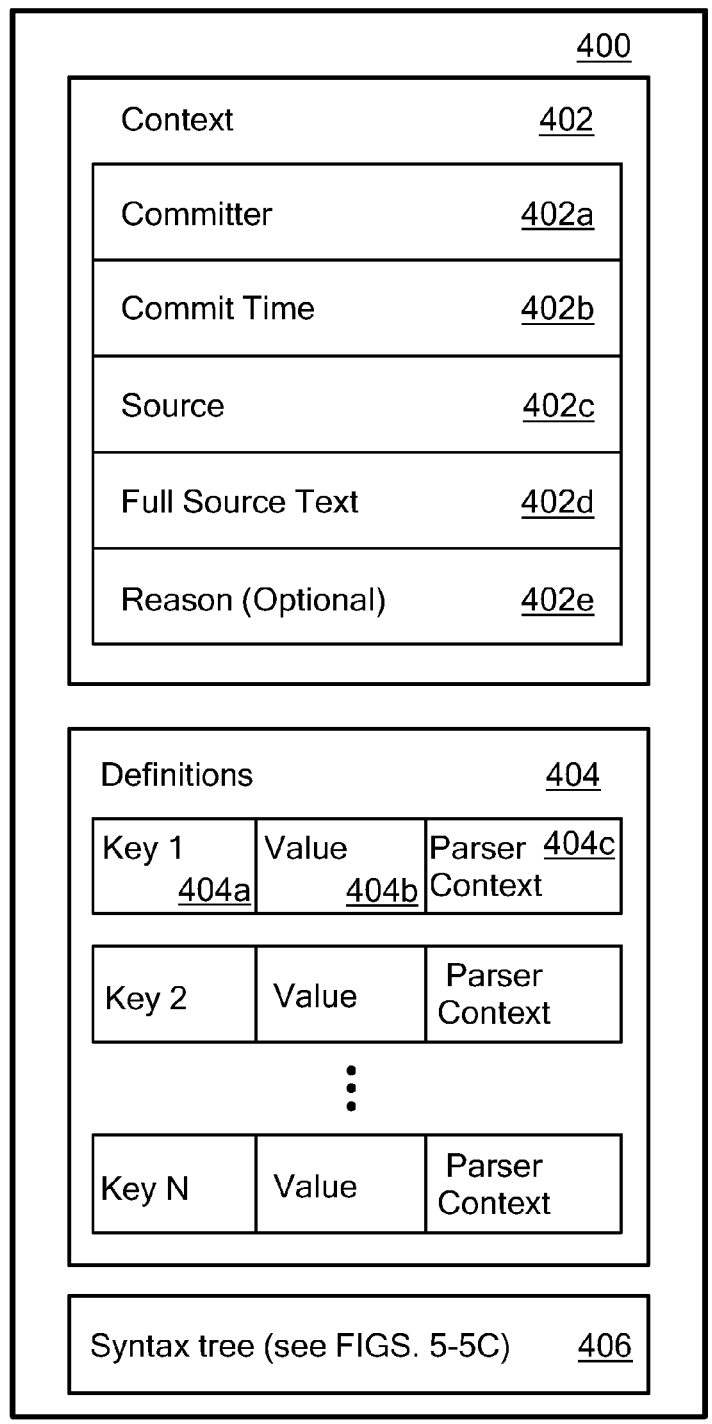
FIG. 4 is a diagram of an exemplary transaction commit for use in a configuration system.

Referring now to FIG. 4, an exemplary commit 400 for use within the configuration manager 200 (FIG. 2), is shown. In one aspect, the commit 400 represents a data structure used within the configuration manager, or more specifically, within the syntax parser 202, semantic validator 204, and/or syntax history module 208. The exemplary commit 400 includes context information 402, one or more key definitions 404, and a syntax tree 406, which is described in detail below in conjunction with FIGS. 5-5B.

The context information 400 may include the identity of committer 402a, the commit time 402b, a source identifier 402c, full source text 402d, and an optional reason 402e. The committer 402 generally identifies a person, if known, that introduced the corresponding configuration changes into the configuration system. If the commit 400 represents a property file loaded at startup, the committer 402a may be empty. If the commit 400 represents a reloaded property file, the committer 402a may identify the person or system that requested the reload. If the commit 400 represents changes from a tool 120b, 120c (FIG. 1), the committer 402a may identify the person using that tool; in this case, the tool would send this information to the configuration manager 112.

The commit time 402b is a date/timestamp indicating the time the commit was accepted and/or added to the transaction history. The source identifier 402c generally identifies the configuration source 214 which provided the corresponding key definitions. For example, if a change was provided by a tool 120b, 120c (FIG. 1), the source identifier 402c may be the name of that tool. If the commit is based from a property file 120a, the source identifier may be a file system path associated that file. The full source text 402d generally includes the full text provided by the configuration source 214 to the syntax parser 202 (FIG. 2). If the configuration source is a property file 120a, the full text source 402d may be the contents of that file. If the configuration source is a centralized configuration system 120d, the full text source 402d may include an HTTP request and/or response. In some embodiments, the commit includes a reason for the change 402e, which may be entered by the operator via a configuration source, such as within a tool 120b, 120c.

Each of the key definitions 404 includes a key 404a, a value 404b, and parser context 404c. The key 404a may include an absolute key path determined by the syntax parser. The value 404b is an un-typed syntax parsed from text provided by a configuration source. The parser context 303c includes any context information associated with the key definition that may be useful to an operator for investigating system behavior. For example, if the commit is based upon a property file, the parser context 404c may include the file system path and line number where the corresponding setting is defined. The context may also include the unparsed text of that line and/or surrounding lines (i.e. lines before and after).

Those skilled in the art will appreciate that various additional information may be stored along with a commit 400 to improve the performance (e.g. decrease required processing power and/or time, decrease memory usage, etc.) of the configuration system and/or provide additional context to the operator during investigations. In one embodiment, the each of the key definitions 404 includes not only the new value, but also the previous value so that an operator (via the inspection module 212) can determine the effect of a given commit without having to access the previous commit.

Figure 5:
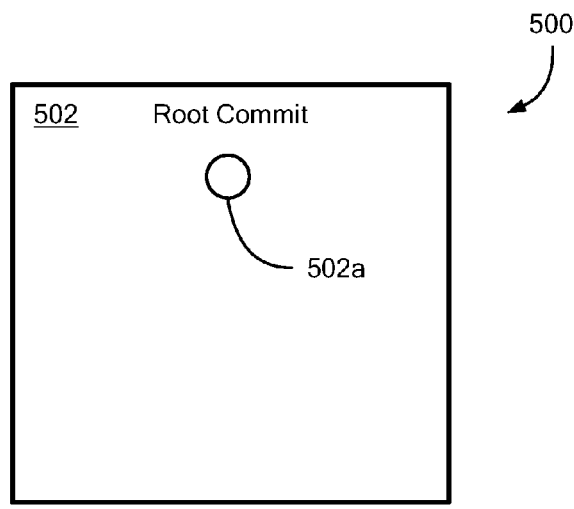
FIGS. 5-5C are diagrams of an exemplary transaction history for use in a configuration system.
Figure 5A:
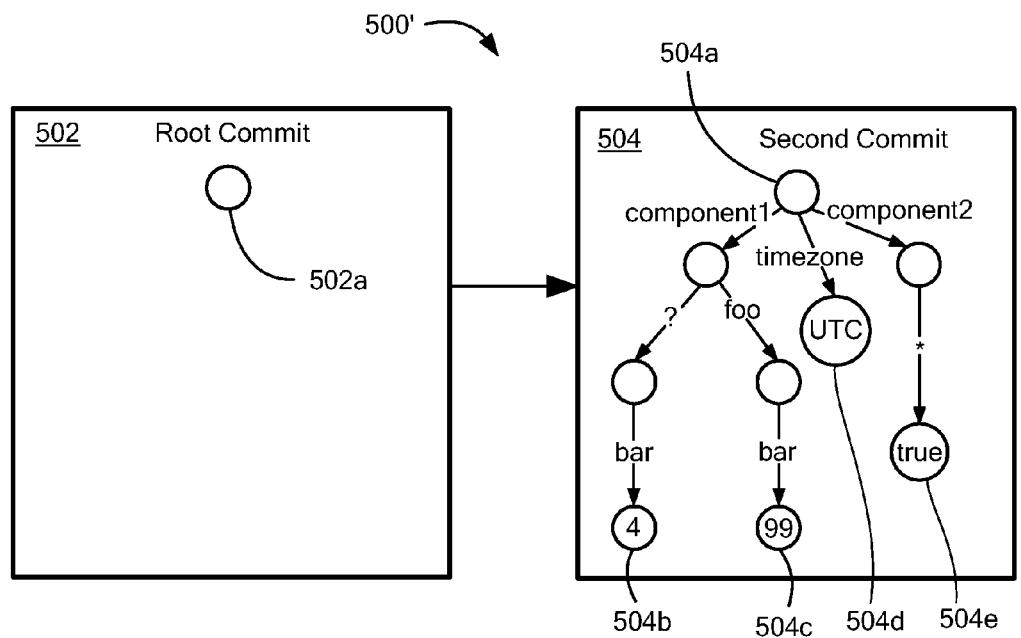
Figure 5B:
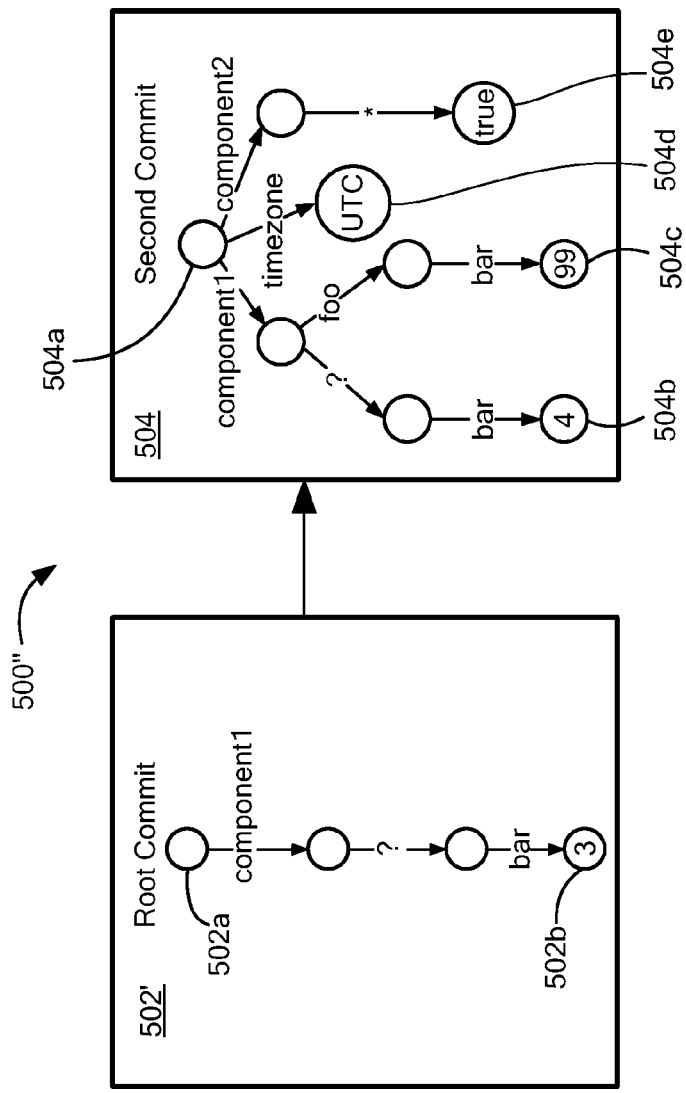
Figure 5C:
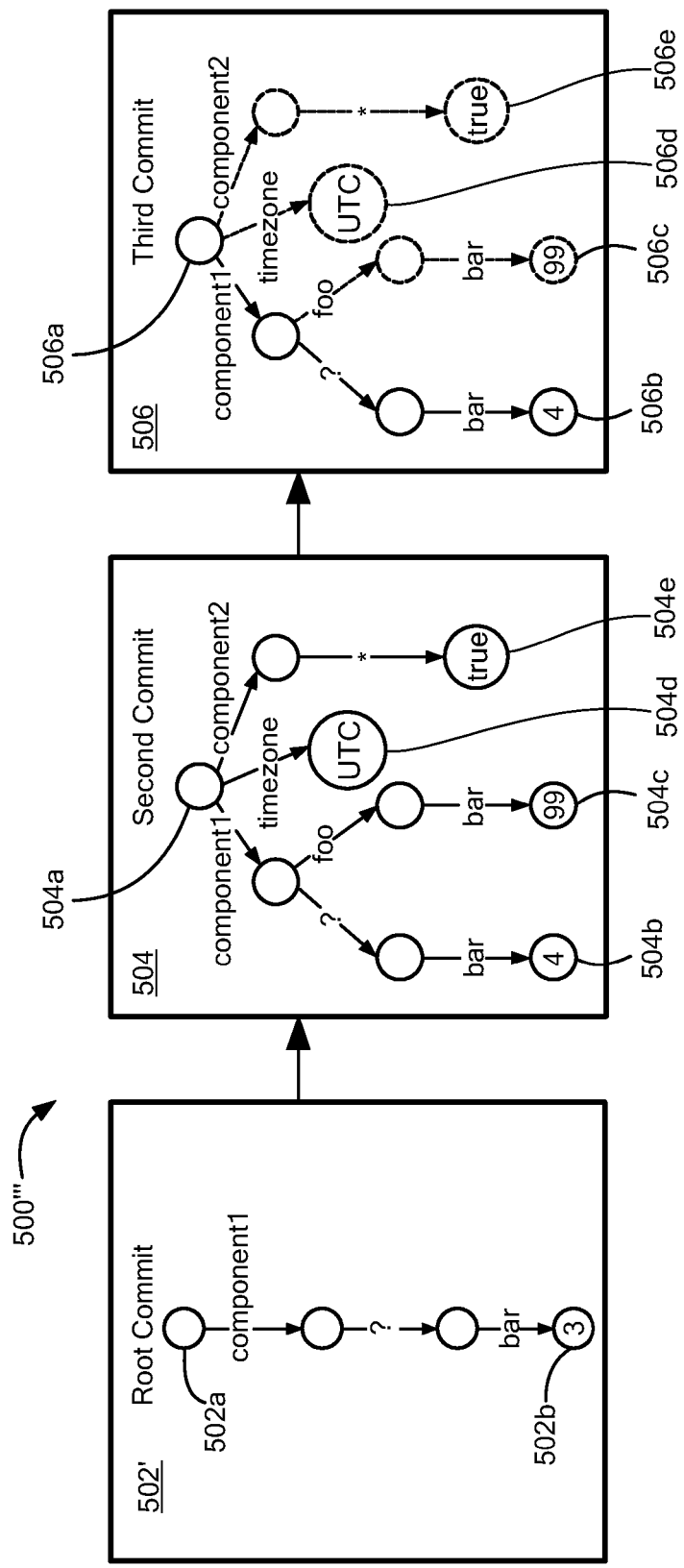

Referring now to FIGS. 5-5B, an exemplary transaction history is shown in four different states, generally designated as 500 (FIG. 5), 500' (FIG. 5A), 500" (FIG. 5B), and 500''' (FIG. 5B). Each state of the transaction history represents the state of the configuration system at a given point time, with FIGS. 5-5B in chronological order from earliest to latest. Thus, transaction history 500 represents an initial state and transaction history 500''' represents a latest state. In one aspect, the transaction histories 500, 500', 500", 500''' represent data structures used within the configuration manager 212 (FIG. 2) and/or syntax history module 208. Like elements are shown having like reference designations within FIGS. 5-5B.

Each transaction history includes a chronologically ordered, from left to right, list of commits, typified by commits 502, 504 in FIG. 5A. Each commit generally includes the same information included within exemplary commit 400 of FIG. 4, although only the syntax tree 406 portion of each commit is shown here. Each syntax tree represents a discrete configuration state (in terms of syntax); more particularly, each syntax tree generally represents all the key definitions at given point in time. In most embodiments, the transaction history includes a special commit, referred to as the root commit 502, used to store code defaults. The root commit 502 appears first in the transaction history list, as shown. In a particular embodiment, the syntax trees are abstract syntax trees (AST) generated by the syntax parser 202 (FIG. 2).

First, as shown in FIG. 5, the transaction history 500 includes the root commit 502 having only a root node 502a, which indicates that no code defaults have yet been defined. Thus, the transaction history 500 may illustrate the state of the configuration system at startup, before any components have been initialized.

Next, as shown in FIG. 5A, the transaction history 500' includes the root commit 502 and a second commit 504. The second commit 504 syntax tree includes a root node 504a and leaf nodes 504b, 504c, 504d. Each branch includes a label that corresponds to a key part. The path from the root node to a leaf node includes one or more branches and the combined branch labels define a key path. Each leaf node includes an un-typed value corresponding to that leaf node's key path. Thus, it should be appreciated that each leaf node represents a key definition. For example, the path from the root node 504a to leaf node 504b includes, in order, the branches labeled "component1", "?", and "bar" and, therefore, the leaf node 504b defines the key "component1.?.bar" to be "4". Similarly, the leaf node 504c defines the key "component1.foo.bar" to be "99" the leaf node 504d defines the key "timezone" to be "UTC", and the leaf node 504d defines the key "component2.*" to be "true". It should be appreciated that the second commit 504 may correspond to the exemplary property file 300 (FIG. 3).

Next, as shown in FIG. 5B, the exemplary transaction history 500" includes a root commit 502' and the second commit 504. The root commit 502', which is different from root commit 502, has a syntax tree defining the key "component1.?.bar" to be "3". Thus, the root commit 502' defines a single code default.

To provide efficient lookup of present configuration values, earlier commits are merged into the latest commit such that latest commit includes a complete representation of the present configuration state. Thus, when the code default is added to the root commit (i.e. when the state transitions from 500' to 500"), the configuration manager merges the root commit 502' into the second commit 504. In merging, any keys defined in earlier commit that are not also defined in the latest commit are added to that latest commit. Thus, because the key "component1.?.bar" is defined within the second commit 504, the root commit definition of that key is not added into the second commit. If, on the other hand, the second commit 504 did not define the key "component1.?.bar", the code default value "3" would have been merged into (i.e. added to) the second commit 504.

It should be appreciated that, because code defaults are always defined within the earliest commit (i.e. the root commit), they are given the lower precedence than other key definitions, which achieves desirable semantics. In some embodiments, the root commit is the only commit that is mutable.

Next, as shown in FIG. 5B, the exemplary transaction history 500''' includes the root commit 502', the second commit 504, and a third commit 506. The third commit 506 defines the key "component1.?.bar" to be "42" and also includes the previous key definitions merged from the second commit 504 (the merged leaf nodes 506c, 506d, 506e are shown in FIG. 5B using dashed lines). The third commit 506 may represent an override made by an operator via tool 120b, 120c (FIG. 1). Before the change is accepted, it is validated against the present semantics. Notably, the change will be rejected if the value "42" is not compatible with a data type constraint registered for the key "component1.?.bar". Notably, the second commit 504 remains unaffected by the operator's override, thereby allowing the configuration state to be rolled back simply by removing the third commit 506 from the transaction history.

It should be appreciated that the configuration definitions illustrated in FIGS. 3, 3A, and 5-5B merely examples provided for convenience of explanation. The systems and methods sought to be protected herein are generally applicable to an arbitrary set of configuration definitions and thus can be used with complex software systems having thousands of configuration settings and small software applications having relatively few configuration settings.

Figure 6:
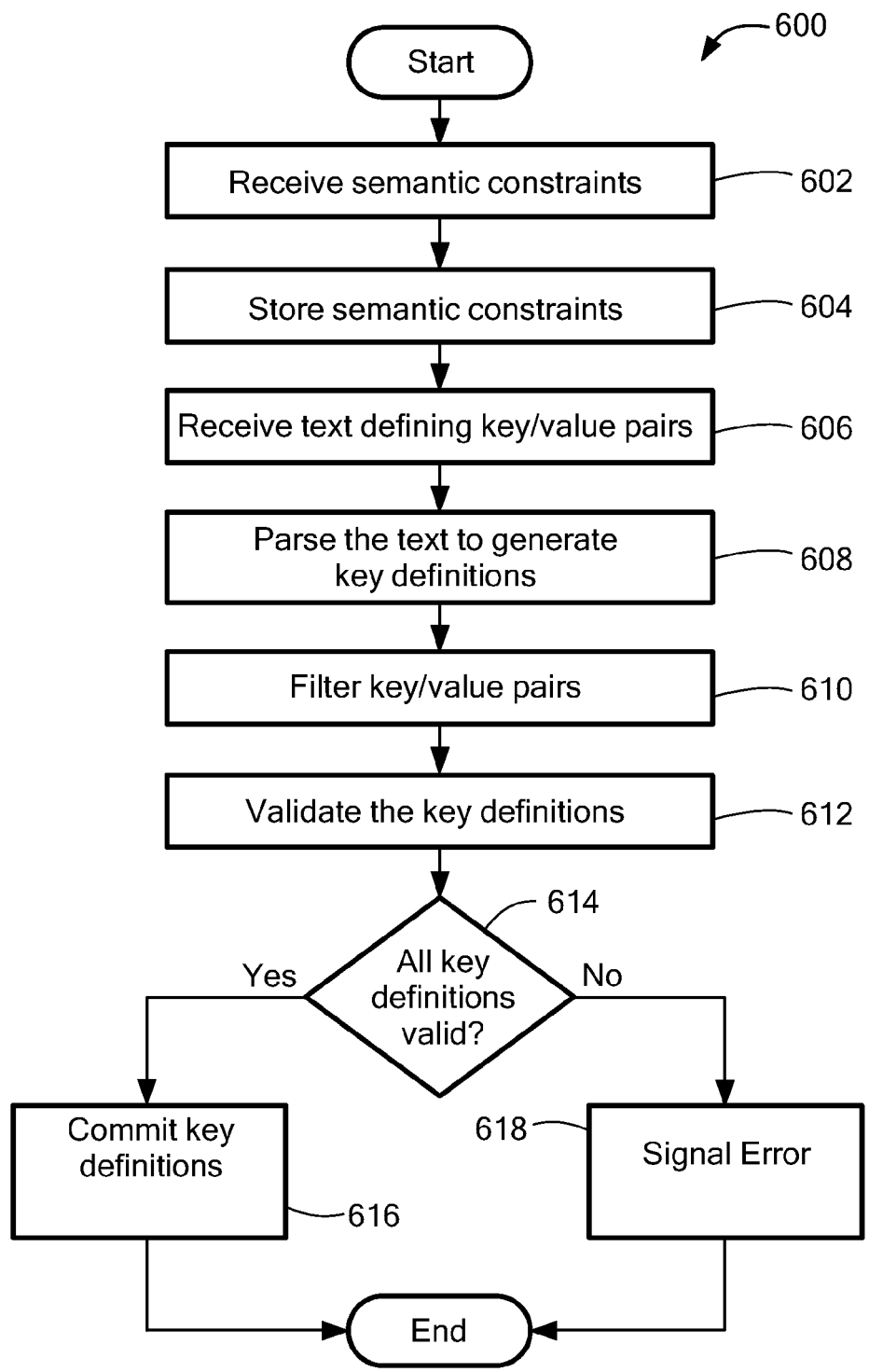
FIG. 6 is a flowchart illustrating an exemplary method for use within a configuration system.
Figure 7:
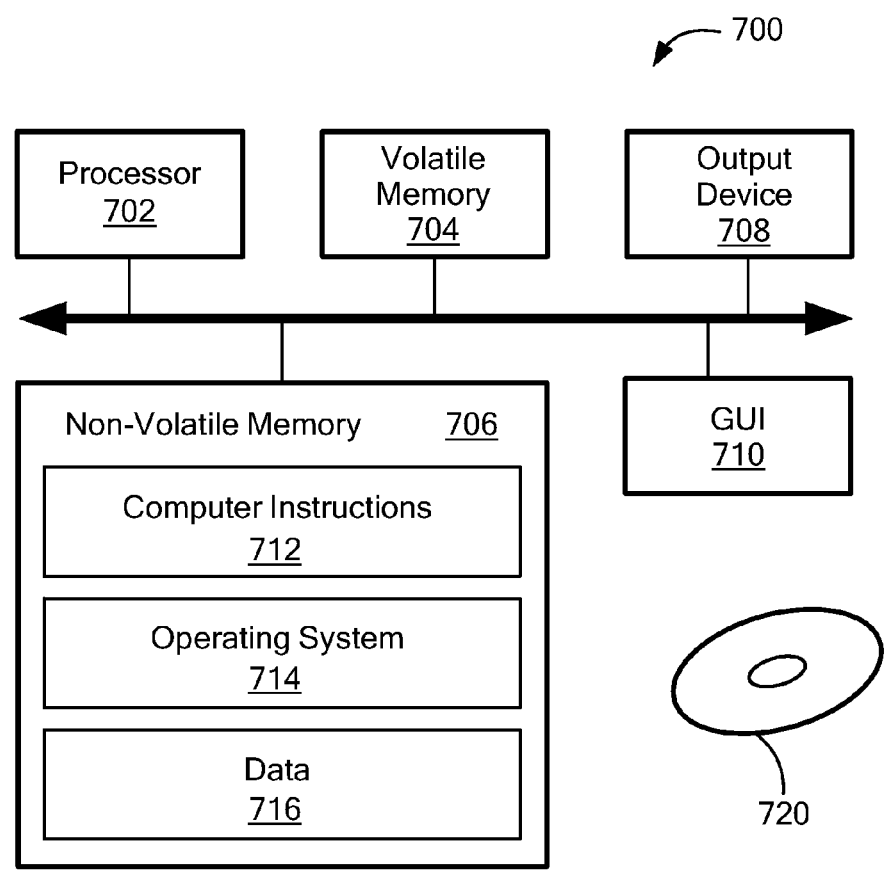
FIG. 7 is a schematic representation of an exemplary computer.

Referring now to FIG. 6, an exemplary method 600 for use within the configuration manager 200 (FIG. 2), is shown. It should be appreciated that FIG. 6 show a flowchart corresponding to the below contemplated technique which would be implemented in computer system 700 (FIG. 7). Rectangular elements (typified by element 602), herein denoted "processing blocks," represent computer software instructions or groups of instructions. Diamond shaped elements (typified by element 612), herein denoted "decision blocks," represent computer software instructions, or groups of instructions, which affect the execution of the computer software instructions represented by the processing blocks.

Alternatively, the processing and decision blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required of the particular apparatus. It should be noted that many routine program elements, such as initialization of loops and variables and the use of temporary variables are not shown. It will be appreciated by those of ordinary skill in the art that unless otherwise indicated herein, the particular sequence of blocks described is illustrative only and can be varied without departing from the spirit of the systems and methods sought to be protected herein. Thus, unless otherwise stated the blocks described below are unordered meaning that, when possible, the steps can be performed in any convenient or desirable order.

The exemplary method 600 begins at block 602, where one or more semantics constraints are received. In one embodiment, the semantic constraints are received by a registration module 210 (FIG. 2) from an application component 216. In a certain embodiment, the semantics constraints are received by a semantic registry 206 (FIG. 2) from the registration module 210. Next, at block 604, the semantic constraints are stored in a memory. In an exemplary embodiment, the semantic registry 206 does the storing, as discussed further above in conjunction with FIG. 2.

Next, at block 606, text defining a plurality of key/value definitions is received. In one embodiment, the text may be received by the syntax parser 202 (FIG. 2) from a configuration source 214. Next, at block 608, the text is parsed to generate a plurality of key definitions, each key having a key and a value, each definition corresponding to one of the key/value pairs. Next, at block 610, the key/value pairs may be filtered according to the techniques described above in conjunction with FIG. 2. In a certain embodiment, the processing of blocks 608, 610 may be performed by the syntax parser 202 (FIG. 2).

Next, at block 612, the key definitions are validated using the semantic constraints. In one embodiment, the validating is performed by the semantic validator 204 using validation techniques described above in conjunction with FIG. 2. If all of the key definitions are valid (block 614), the key definitions may be committed to the memory (block 616). In an exemplary embodiment, a syntax history module 208 (FIG. 2) commits the key definitions to the memory. Otherwise, an error is signaled (block 618).

In embodiments, processing blocks 606-612 may be performed before blocks 600, 602.

FIG. 7 shows an exemplary computer 700 that can perform at least part of the processing described herein. The computer 700 includes a processor 702, a volatile memory 704, a non-volatile memory 706 (e.g., hard disk), an output device 708 and a graphical user interface (GUI) 710 (e.g., a mouse, a keyboard, a display, for example), each of which is coupled together by a computer bus 718. The non-volatile memory 706 stores computer instructions 712, an operating system 714, and data 716. In one example, the computer instructions 712 are executed by the processor 702 out of volatile memory 704. In one embodiment, an article 720 comprises non-transitory computer-readable instructions.

Processing may be implemented in hardware, software, or a combination of the two. Processing may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processing and to generate output information.

The system can perform processing, at least in part, via a computer program product, (e.g., in a machine-readable storage device), for execution by, or to control the operation of, data processing apparatus (e.g., a programmable processor, a computer, or multiple computers). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer. Processing may also be implemented as a machine-readable storage medium, configured with a computer program, where upon execution, instructions in the computer program cause the computer to operate.

Processing may be performed by one or more programmable processors executing one or more computer programs to perform the functions of the system. All or part of the system may be implemented as, special purpose logic circuitry (e.g., an FPGA (field programmable gate array) and/or an ASIC (application-specific integrated circuit)).

It should now be appreciated that the configuration methods and systems presently described are widely applicable to many different types of software systems, services, and applications. For example, the methods and systems sought to be protected herein may be used within storage pool selection systems, such as are described in U.S. patent application Ser. No. 14/037,663 ("METHODS AND APPARATUS FOR STORAGE POOL SELECTION"), which is incorporated herein by reference. All references cited herein are hereby incorporated herein by reference in their entirety.

Having described exemplary embodiments of the systems and methods sought to be protected herein it will now become apparent to those of ordinary skill in the art that other embodiments incorporating these concepts may be used. Additionally, the software included as part of the systems and methods sought to be protected herein may be embodied in a computer program product that includes a computer-readable storage medium. For example, such a computer-readable storage medium can include a computer-readable memory device, such as a hard drive device, a CD-ROM, a DVD-ROM, or a computer diskette, having computer-readable program code segments stored thereon. In contrast, a computer-readable transmission medium can include a communications link, either optical, wired, or wireless, having program code segments carried thereon as digital or analog signals. Accordingly, it is submitted that that the systems and methods sought to be protected herein should not be limited to the described embodiments but rather should be limited only by the spirit and scope of the appended claims. All publications and references cited herein are expressly incorporated herein by reference in their entirety.

What is claimed is:

1. A computer system, comprising:
a memory;
a plurality of configuration keys;
a semantic registry to store, in the memory, a plurality of semantic constraints, each of the plurality of semantic constraints associated with one of the plurality of configuration keys;
a syntax parser to receive text from a configuration source, to parse the text to generate a plurality of key definitions, each of the key definitions associated with one of the plurality of configuration keys and having a corresponding value;
a semantic validator to receive the plurality of key definitions and to validate each of the plurality of key definitions using ones of the plurality of semantic constraints associated with the same key as the key definition; and
a syntax history module to maintain an ordered list of commits in the memory, each commit having one or more committed key definitions; and
at least one application component configured to register semantic constraints with the semantic registry and to register key definitions with the syntax history module, wherein in response to parsing text received from a configuration source, the syntax history module appends an immutable commit to the end of the list of commits, and wherein in response to receiving key definitions registered from the at least one application component, the syntax history module mutates a first commit within the list of commits.

2. The system of claim 1 wherein at least one of the semantic constraints includes a data type and validating the plurality of key definitions comprises determining if at least one of the key definitions has a value compatible with the data type.

3. The system of claim 1 wherein validating the plurality of key definitions comprises determining of any two of the key definitions comprise the same key.

4. The system of claim 1 wherein each commit comprises a tree, each leaf of the tree generally corresponding to one of the plurality of key definitions.

5. The system of claim 4, the syntax history module further to merge commits by copying a portion of a first tree to a second tree.

6. The system of claim 1 further comprising an input/output (IO) module to read a property file, wherein the text is based upon the contents of the property file.

7. The computer system of claim 1 wherein the at least one application component can register semantic constraints with the semantic registry after the syntax parser parses text from the configuration source.

8. A method implemented in a computer system comprising a memory, the method comprising:
receiving, from an application component, a plurality of semantic constraints, each of the plurality of semantic constraints associated with one of a plurality of configuration keys;
storing the semantic constraints to the memory;
receiving text from a configuration source;
parsing the text to generate a plurality of first key definitions, each of the first key definitions associated with one or more configuration keys and having a corresponding value;
validating each of the first key definitions using ones of the plurality of semantic constraints associated with the same configuration keys as the key definition;
appending an immutable commit to the end of an ordered list of commits stored in the memory, the appended commit comprising the first key definitions;
receiving second key definitions from the application component; and mutating a first commit within the ordered list of commits to store the second key definitions.

9. The method of claim 8 wherein receiving the text occurs before receiving the one or more semantic constraints.

10. The method of claim 8 wherein at least one of the semantic constraints includes a data type and validating the plurality of key definitions comprises determining if at least one of the key definitions has a value compatible with the data type.

11. The method of claim 8 wherein validating the plurality of key definitions comprises determining of any two of the key definitions comprise the same configuration key.

12. The method of claim 8 further comprising removing a commit from the end of the list of commits.

13. The method of claim 12 wherein each commit comprises a tree, each leaf of the tree generally corresponding to one of the plurality of key definitions.

14. The method of claim 13 wherein the ordered list includes a first commit and a second commit, the method further comprising merging commits by copying a portion of the first commit tree to the second commit tree, the portion of the tree corresponding to one or more key definitions in the first commit.

15. The method of claim 14 wherein each of the plurality of key definitions is either an explicit key definition or a default key definition, and an explicit key definition in the first commit is copied to the second commit tree only if the second commit does not include a corresponding explicit key definition.

16. The method of claim 14 wherein each of the plurality of key definitions is either an explicit key definition or a default key definition, and a default key definition in the first commit is copied to the second commit tree only if the second commit does not include a corresponding key definition.

17. The method of claim 8 further comprising reading a property file, wherein the text is based upon the contents of the property file.

18. A computer program product tangibly embodied in a non-transitory computer-readable medium, the computer-readable medium storing program instructions that are executable to:

receive, from an application component, a plurality of semantic constraints, each of the plurality of semantic constraints associated with one of a plurality of configuration keys;

store the semantic constraints to a memory;

receive text from a configuration source;

parse the text to generate a plurality of first key definitions, each of the first key definitions associated with one or more configuration keys and having a corresponding value;

validate each of the first key definitions using ones of the plurality of semantic constraints associated with the same configuration keys as the key definition;

append an immutable commit to the end of an ordered list of commits stored in the memory, the appended commit comprising the first key definitions;

receive second key definitions from the application component; and mutate a first commit within the ordered list of commits to store the second key definitions.

* * * * *